(12) United States Patent
Duesel, Jr. et al.

(10) Patent No.: US 11,383,995 B2
(45) Date of Patent: Jul. 12, 2022

(54) APPARATUS AND METHOD FOR TREATING HYDROGEN SULFIDE AND AMMONIA IN WASTEWATER STREAMS

(71) Applicant: HEARTLAND WATER TECHNOLOGY, INC., St Louis, MO (US)

(72) Inventors: Bernard F. Duesel, Jr., Goshen, NY (US); Craig Clerkin, Stoughton, WI (US); Benjamin N. Laurent, Cottage Grove, WI (US)

(73) Assignee: HEARTLAND WATER TECHNOLOGY, INC., St Louis, MO (US)

( * ) Notice: Subject to any disclaimer, the term of this patent is extended or adjusted under 35 U.S.C. 154(b) by 583 days.

(21) Appl. No.: 16/368,317

(22) Filed: Mar. 28, 2019

(65) Prior Publication Data
US 2019/0300409 A1    Oct. 3, 2019

Related U.S. Application Data

(60) Provisional application No. 62/649,243, filed on Mar. 28, 2018.

(51) Int. Cl.
*B01D 53/58* (2006.01)
*B01D 53/78* (2006.01)
*C02F 1/04* (2006.01)
*C02F 1/72* (2006.01)
*C02F 101/10* (2006.01)
(Continued)

(52) U.S. Cl.
CPC ............. *C02F 9/00* (2013.01); *B01D 53/58* (2013.01); *B01D 53/78* (2013.01); *B01D 2251/506* (2013.01); *C02F 1/048* (2013.01); *C02F 1/20* (2013.01); *C02F 1/441* (2013.01); *C02F 1/5236* (2013.01); *C02F 1/5245* (2013.01); *C02F 1/722* (2013.01); *C02F 2101/101* (2013.01); *C02F 2101/16* (2013.01); *C02F 2103/06* (2013.01);
(Continued)

(58) Field of Classification Search
CPC .. C02F 9/00; C02F 2101/16; C02F 2101/101; C02F 2103/06; C02F 1/048; C02F 1/20; B01D 53/58; B01D 53/78
See application file for complete search history.

(56) References Cited

U.S. PATENT DOCUMENTS

| 8,252,183 | B1 * | 8/2012 | Massingill | ............... C02F 9/00 |
| | | | | 210/602 |
| 8,609,926 | B1 * | 12/2013 | Cox, Jr. | .................... C02F 3/30 |
| | | | | 588/320 |

(Continued)

FOREIGN PATENT DOCUMENTS

WO    WO-2011014617 A2 *    2/2011 ............... C02F 1/16

*Primary Examiner* — Bradley R Spies
(74) *Attorney, Agent, or Firm* — Marshall, Gerstein & Borun LLP (57) ABSTRACT

A process of removing contaminants and concentrating wastewater includes delivering wastewater from a source of wastewater to a hydrogen sulfide removal device, mixing an oxidant with the filtered wastewater in the hydrogen sulfide removal device to produce a hydrogen sulfide lean effluent, delivering the hydrogen sulfide lean effluent to a direct contact concentrator, and evaporating a portion of the hydrogen lean effluent in the direct contact evaporator to produce a slurry and an exhaust gas.

19 Claims, 5 Drawing Sheets

(51) Int. Cl.
  *C02F 101/16* (2006.01)
  *C02F 9/00* (2006.01)
  *C02F 1/20* (2006.01)
  *C02F 1/44* (2006.01)
  *C02F 1/52* (2006.01)
  *C02F 103/06* (2006.01)
  *C02F 103/18* (2006.01)

(52) U.S. Cl.
  CPC ...... *C02F 2103/18* (2013.01); *C02F 2303/12* (2013.01)

(56) References Cited

U.S. PATENT DOCUMENTS

| | | | |
|---|---|---|---|
| 2013/0035528 A1* | 2/2013 | Marker | C10L 1/04 585/242 |
| 2015/0157953 A1* | 6/2015 | Duesel, Jr. | C02F 1/16 95/24 |
| 2016/0243494 A1* | 8/2016 | Gansley | B01D 1/20 |
| 2018/0079672 A1* | 3/2018 | Meyer | B01D 53/1475 |

* cited by examiner

APPARATUS AND METHOD FOR TREATING HYDROGEN SULFIDE AND AMMONIA IN WASTEWATER STREAMS

FIELD OF THE DISCLOSURE

This application relates generally to systems and methods for removing hydrogen sulfide and/or ammonia from wastewater streams, and more specifically to systems and methods that remove hydrogen sulfide and/or ammonia from the wastewater stream serially with a concentrator and with either a reverse osmosis system or an ammonia removal system, or both a reverse osmosis system and an ammonia removal system, serially connected to the concentrator.

BACKGROUND

Concentration of wastewater streams may be advantageous to reduce the volume of liquid that needs to be treated and/or disposed of, and this concentration may be carried out within various types of commercial processing systems. At high levels of concentration, many wastewater streams may be reduced to residual material in the form of slurries containing high levels of dissolved and suspended solids. Such concentrated residual may be readily solidified by conventional techniques for disposal within landfills or, as applicable, delivered to downstream processes for further treatment prior to final disposal. Concentrating wastewater can greatly reduce freight costs and required storage capacity and may be beneficial in downstream processes where materials are recovered from the wastewater.

An important measure of the effectiveness of a wastewater concentration process is the volume of residual produced in proportion to the volume of wastewater entering the process. In particular, low ratios of residual volume to feed volume (high levels of concentration) are the most desirable. Where the wastewater contains dissolved and/or suspended non-volatile matter, the volume reduction that may be achieved in a particular concentration process that relies on evaporation of volatiles is, to a great extent, limited by the method chosen to transfer heat to the process fluid.

Conventional processes that affect concentration by evaporation of water may be classified as direct or indirect heat transfer systems depending upon the method employed to transfer heat to the liquid undergoing concentration (the process fluid). Indirect heat transfer devices generally include jacketed vessels that contain the process fluid, or plate, bayonet tube or coil type heat exchangers that are immersed within the process fluid. Mediums such as steam or hot oil are passed through the jackets or heat exchangers in order to transfer the heat required for evaporation. Direct heat transfer devices implement processes where the heating medium is brought into direct contact with the process fluid, which occurs in, for example, submerged combustion gas systems.

In some cases it may be desirable to concentrate landfill leachate. However, landfill leachate may contain hazardous compounds, such as hydrogen sulfide ($H_2S$) and/or ammonia, among others.

Hydrogen sulfide ($H_2S$) is a known poisonous gas that can be generated by bacterial decomposition (chemical reduction) of compounds containing sulfur, sulfites, and sulfates that are present within wastes that have been placed in a landfill. Thus formed, $H_2S$ joins with other gases produced by all forms of bacterial action carried out in the landfill to form landfill gas. Generally, the greater the amount of wastes that contain sulfur, sulfites, and sulfates, the greater the amount of hydrogen sulfide that may be expected. For example, landfills may have quantities of sulfates from sources of calcium sulfate (e.g., gypsum wallboard materials) that contribute as much as 10,000 parts per million (weight basis) or greater $H_2S$ to the landfill gas. The hydrogen sulfide is part of the landfill gas that is burned in the landfill gas flare. Burning the $H_2S$ in a gas flare, reciprocating engine, or turbine is beneficial because the $H_2S$ is converted to oxides of sulfur (SOx), thus avoiding expensive pretreatment of the landfill gas to remove the $H_2S$. However, $H_2S$ is also slightly soluble in water and thus, a portion of the $H_2S$ remains in the liquid portion of the landfill leachate.

Ammonia is an air pollutant and a precursor of particulate formation in exhaust gases when released to atmosphere. Because ammonia is highly soluble in water, it is normally found in the wastewater (e.g., leachate) at landfill facilities, as opposed to being located in the landfill gas.

Currently, landfill leachate containing ammonia can be treated with an agent (e.g., a caustic or alkali, such as sodium hydroxide or lime) capable of raising pH of the leachate. The increased-pH leachate can be passed into an air stripper where ammonia in the wastewater will migrate into the air stripper's exhaust air. The exhaust air from the air stripper can be combined with the combustion and excess air employed in the operation of a flare, reciprocating engine or turbine responsible for providing heat to the concentration process. However, this method of removing ammonia is completed prior to the concentration process, which can leave some ammonia dissolved in the leachate.

SUMMARY

In one embodiment, a process of removing contaminants and concentrating wastewater includes delivering wastewater from a source of wastewater to a hydrogen sulfide removal device, mixing an oxidant with the filtered wastewater in the hydrogen sulfide removal device to produce a hydrogen sulfide lean effluent, delivering the hydrogen sulfide lean effluent to a direct contact concentrator, and evaporating a portion of the hydrogen lean effluent in the direct contact evaporator to produce a slurry and an exhaust gas.

In another embodiment, a process of removing contaminants and concentrating wastewater includes delivering wastewater from a source of wastewater to a direct contact concentrator, evaporating a portion of the wastewater in the direct contact evaporator to produce a slurry and an exhaust gas, delivering the exhaust gas to an ammonia scrubber, and mixing an acid with the exhaust gas to chemically react with ammonia in the exhaust gas to produce a saturated vapor and an ammonium sulfate.

Any of the forgoing embodiments may include any one or more of the following aspects.

In one aspect, the wastewater is delivered to a reverse osmosis system before delivering the wastewater to the hydrogen sulfide removal device, and the wastewater is filtered n the reverse osmosis system to produce a filtered wastewater and a permeate.

In another aspect, the exhaust gas is delivered to an ammonia scrubber, and an acid is mixed with the exhaust gas to chemically react with ammonia in the exhaust gas to produce a saturated vapor and an ammonium sulfate.

In another aspect, the acid is sulfuric acid.

In another aspect, the oxidant is peroxide.

In another aspect, sodium hydroxide is added to the concentrator.

In another aspect, slurry is delivered to a solid/liquid separator to produce a supernatant liquid and a sludge.

In another aspect, the supernatant liquid is delivered back to the concentrator for further concentration.

In another aspect, an anti-foaming agent is mixed with the effluent in the concentrator.

In another aspect, an anti-scalant agent is mixed with the effluent in the concentrator.

DETAILED DESCRIPTION

Generally, the methods and systems described herein may be used to treat and concentrate wastewater streams, such as leachate from landfill operations. The methods and systems serially treat and concentrate the wastewater streams by firstly filtering the wastewater, for example in a reverse osmosis (RO) system, by secondly removing undesirable substances in the wastewater (such as $H_2S$) in a post-RO/pre-concentration process, by thirdly concentrating the wastewater in a direct contact concentrator, such as the concentrators described in U.S. Pat. Nos. 8,568,557 and 9,296,624, which are hereby incorporated by reference herein, and fourthly by removing evaporated ammonia from the concentrator exhaust. While the described embodiment discloses a system having a RO system, a hydrogen sulfide removal system, and an ammonia removal system all connected to a concentrator, other embodiments may omit any two of the RO system, the hydrogen sulfide removal system, and the ammonia removal system, leaving only one of the RO system, the hydrogen sulfide system, and the ammonia removal system connected to the concentrator, depending on the wastewater chemistry.

Figures 1, 2:
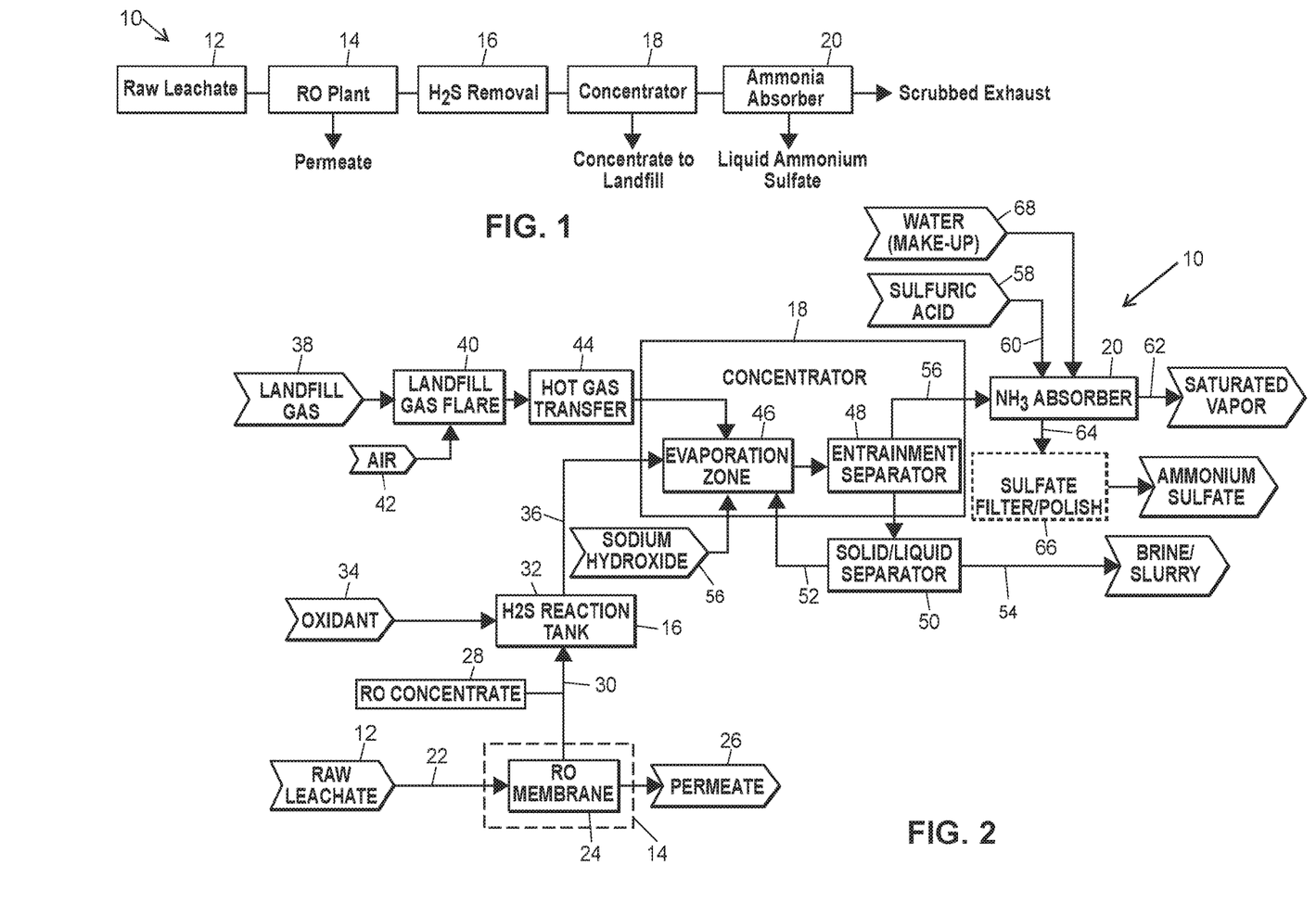
FIG. 1 is a general schematic diagram of a system for treating hydrogen sulfide and ammonia in wastewater streams.
FIG. 2 is a more detailed schematic diagram of the system of FIG. 1.

FIG. 1 illustrates a hydrogen sulfide and ammonia removal system 10 that is constructed in accordance with the teachings of the disclosure. In the disclosed embodiment, the system 10 is used to remove dissolved hydrogen sulfide ($H_2S$) and ammonia in landfill leachate. A source of landfill leachate (or other $H_2S$/ammonia containing liquid) 12 is fluidly connected to a reverse osmosis (RO) device 14. The leachate is processed in the RO device 14 to produce a concentrate that is delivered to a $H_2S$ removal device 16. The $H_2S$ removal device 16 is a tank for receiving the concentrate from the RO device 14. Peroxide is added to the $H_2S$ removal device 16, which causes a chemical reaction that converts the dissolved $H_2S$ into a sulfur precipitate, which remains suspended in the concentrate.

The concentrate is then delivered from the $H_2S$ removal device 16 to a direct contact evaporator or concentrator 18. The concentrator 18 is capable of processing liquids with suspended solids (such as the suspended sulfur precipitate). The concentrator 18 vaporizes a portion of the water in the leachate, as will be described further hereinafter. As the water is vaporized in the concentrator 18, most of the dissolved ammonia in the concentrate will also vaporize. A concentrated slurry, which contains the sulfur precipitate, is extracted from the concentrator 18 and disposed of in a landfill. The exhaust from the concentrator 18 is delivered to an ammonia absorber 20, where the exhaust is contacted by an acid (such as sulfuric acid). The acid reacts with the ammonia gas to form ammonium sulfate, which forms a liquid that is scrubbed out of the exhaust leaving a gas saturated in water vapor. The ammonium sulfate is removed from the ammonia scrubber 20 and may be further processed and/or sold as a product (e.g., fertilizer) if desired.

Figure 3A:
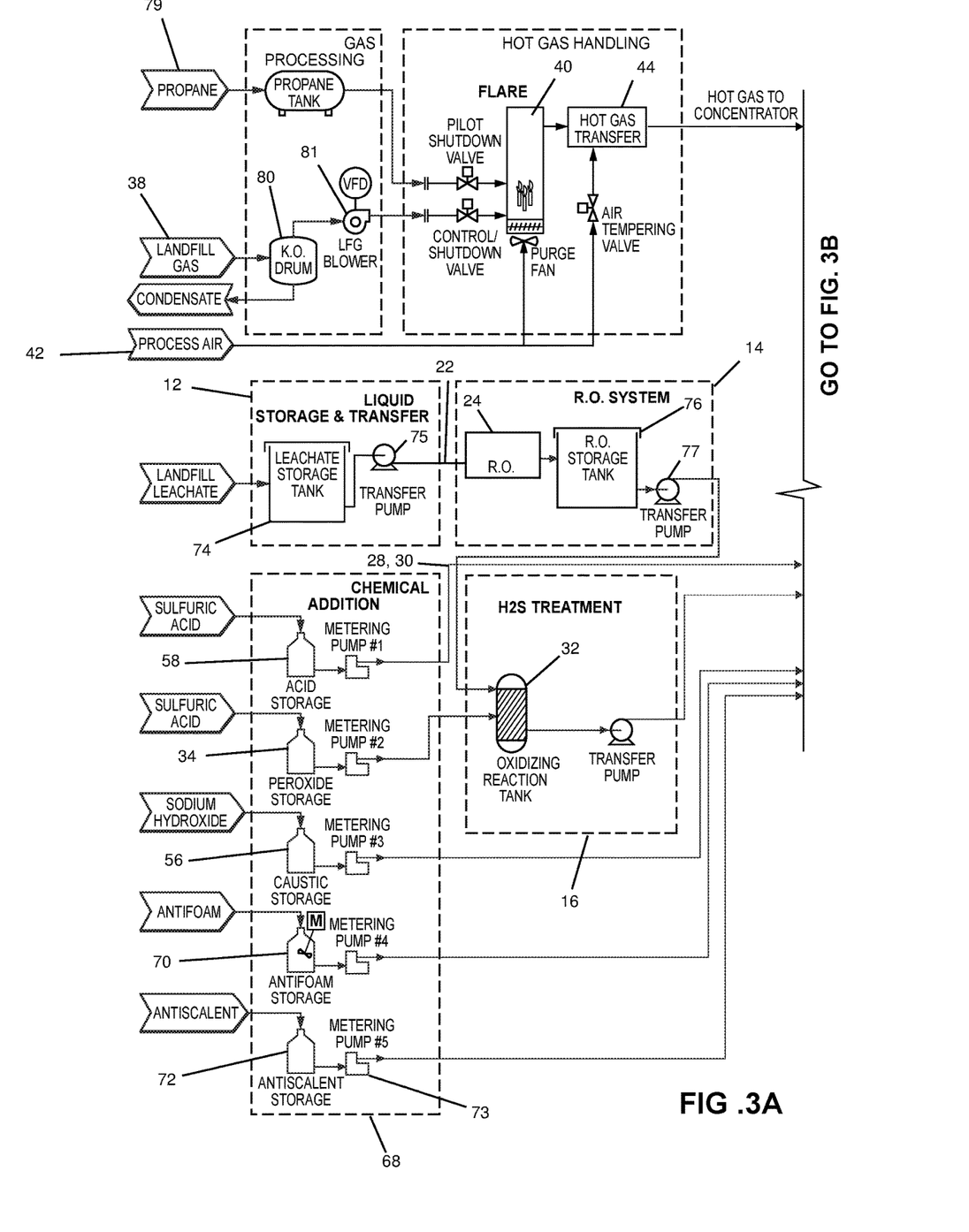
FIGS. 3A and 3B are an even more detailed schematic diagram of the system of FIG. 1.
Figure 3B:
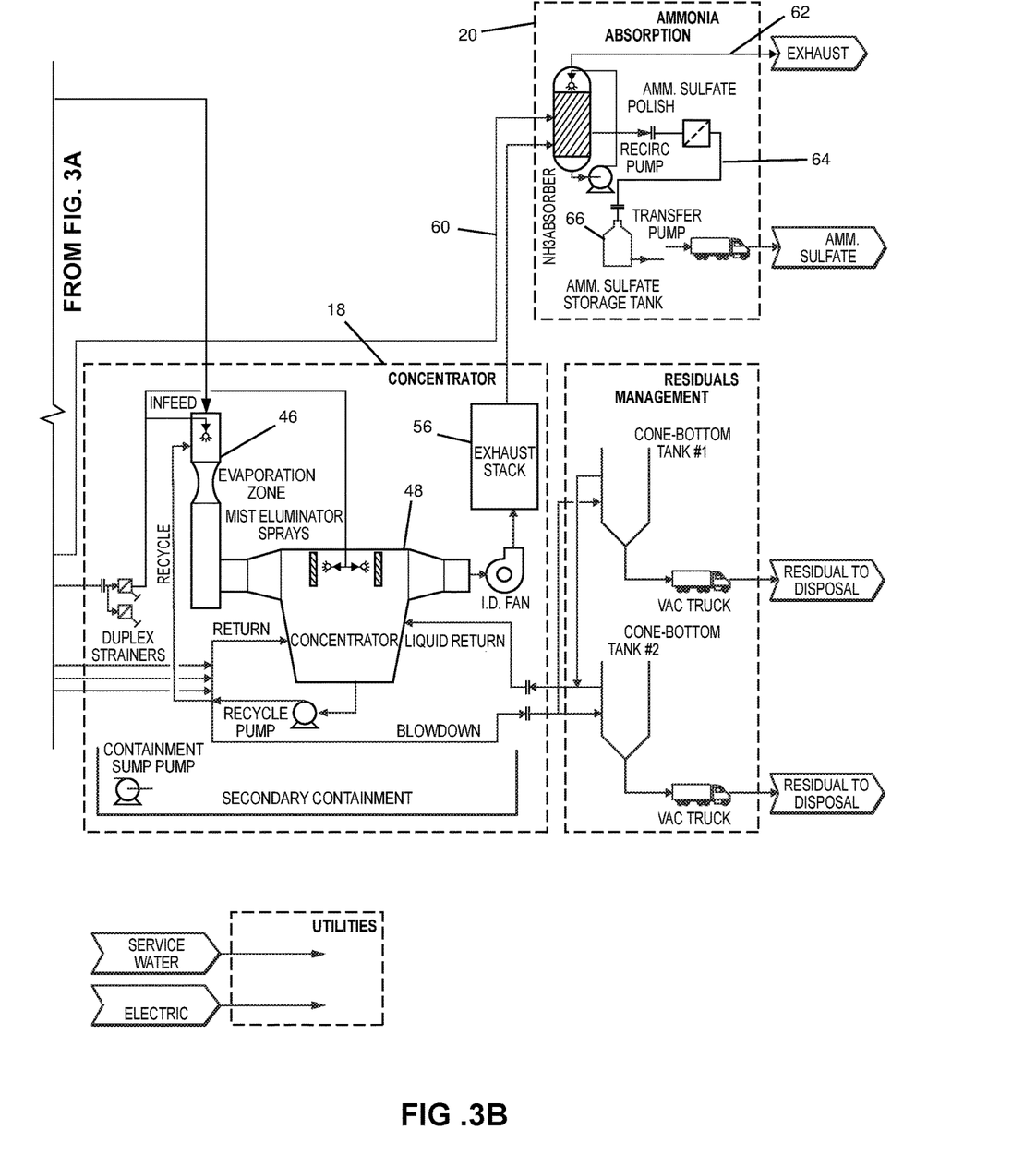

Turning now to FIG. 2, the system 10 is described in more detail. Starting with the source of wastewater, in this case a source of landfill leachate 12, the leachate is delivered from the source of leachate 12 to the RO device 14 through a delivery conduit 22, such as a pipeline. In other embodiments, the conduit 22 may take other forms, such as tanker trucks or other forms of delivery. In the RO device 14, the leachate is forced through a RO membrane 24, which separates permeate 26 from the RO concentrate 28. The permeate 26 may be removed from the RO device 14 and disposed of separately. The RO concentrate 28 is delivered to the $H_2S$ removal device 16 through a concentrate conduit 30, such as a pipeline. While not illustrated in FIG. 2, the system 10 may include pumps and fans (some of which are illustrated in FIGS. 3A and 3B) to move the various liquids and gases between the described components.

The $H_2S$ removal device 16 may include a reaction tank 32. The reaction tank 32 receives the RO concentrate. An oxidant, such as peroxide, is delivered to the reaction tank 32 from a source of oxidant 34. Other oxidants may be used in other embodiments. The peroxide and RO concentrate mix in the reaction tank and a chemical reaction takes place that converts most of the dissolved $H_2S$ in the RO concentrate to a sulfur precipitate, which remains suspended in the RO concentrate. In the disclosed embodiment, up to 95% of the dissolved $H_2S$ is converted to the sulfur precipitate. The RO concentrate and suspended sulfur precipitate are delivered to the concentrator 18 through a concentrate/precipitate conduit 36.

The concentrate and suspended sulfur precipitate are mixed with hot gases in the concentrator to facilitate evaporation and further concentration. The hot gases may be produced by burning a fuel source, such as a source of landfill gas 38. The landfill gas is mixed with air 42 in a flare 40 and combusted. The combusted gas is delivered to the concentrator 18 through a combustion conduit, such as a hot gas transfer pipe 44.

The operation of the concentrator 18 is briefly discussed here and more thoroughly discussed below with respect to FIGS. 4 and 5. The concentrate and suspended sulfur precipitate are mixed with the combustion gas in an evaporation zone 46 of the concentrator 18. In the evaporation zone 46, the liquid and gas are mixed and a portion of the water (and ammonia) are vaporized, producing a mixture of gas and suspended liquid droplets. The liquid droplets are removed from the gas in an entrainment separator, such as a crossflow scrubber 48. The removed liquid droplets coalesce in sump of the crossflow scrubber 48, where they may be removed and allowed to settle into a slurry and a supernatant liquid in a solid/liquid separator, such as a settling tank 50. The supernatant liquid may be returned to the evaporation zone through a recirculating circuit 52 for further concentration. The slurry may be removed from the settling tank 50 through an extraction line 54 for further disposal. Optionally, a caustic agent, such as sodium hydroxide, may be added from a caustic source 56 to reacts with oxides of sulfur (which may be produced by burning $H_2S$ naturally occurring in the landfill gas), converting the oxides of sulfur to sodium sulfate and sodium sulfite or calcium sulfate. Once converted the sodium sulfate, sodium sulfite and/or calcium sulfate immediately transfer into the liquid phase where they either remain dissolved or precipitate out of the gas/liquid mixture. Thus, any sulfur that was originally in the form of $H_2S$ within the landfill gas is transferred to the liquid phase as sodium sulfate/sulfite and calcium sulfite salts and, which are ultimately captured along with the concentrated leachate in the sump of the crossflow scrubber 48.

The demisted gas from the crossflow scrubber 48 exits the concentrator through an exhaust stack 56. The ammonia scrubber 20 is fluidly connected to the exhaust stack 56. The exhaust gas in the exhaust stack 56 includes water vapor and vaporized ammonia. An acid, such as sulfuric acid, is delivered from a source of acid 58 to the ammonia scrubber 20 through an acid conduit 60. The acid is mixed with the exhaust gas in the ammonia scrubber 20, causing the ammonia to react with the acid to form ammonium sulfate, which precipitates out of the exhaust gas leaving saturated water vapor, which, in turn, is released to the atmosphere through a scrubber exhaust 62. The ammonium sulfate may be removed through an ammonium sulfate extraction port 64 and sent to an optional filtering/polishing operation 66 to further refine the ammonium sulfate in preparation for further use or sale.

Turning now to FIGS. 3A and 3B, the system 10 is discussed in even more detail. Chemical addition management may be co-located in a chemical area or on a chemical pad 68, which enhances resupply efficiency while simultaneously simplifying containment measures. In addition to the peroxide source 34, the caustic source 56, and the acid source 58, the chemical pad 68 may also include an antifoam source 70 and an antiscalent source 72. Each of the chemical sources may be connected to a pump 73 that is controlled by a controller to meter desired amounts of the various chemicals to various components of the system.

The source of leachate 12 may include a leachate storage tank 74 and a transfer pump 75 that is connected to the controller.

Similarly, the RO device 14 includes the RO membrane 24 and a RO storage tank 76. A RO transfer pump 77 is connected to the controller and pumps RO concentrate to the $H_2S$ removal device 16.

The $H_2S$ removal device 16 includes the reaction tank 32 and a metering pump 78 that is connected to the controller and meters the RO concentrate and suspended sulfur precipitate to the concentrator 18.

The source of heat may include an alternate source, such as propane 79, which may be burned when the supply of landfill gas is inadequate. The landfill gas 38 may be dewatered in a dewatering device 80 before being burned in the flare 40. A blower pump 81 forces the landfill gas into the flare 40 and may be controlled by the controller.

Figure 4:
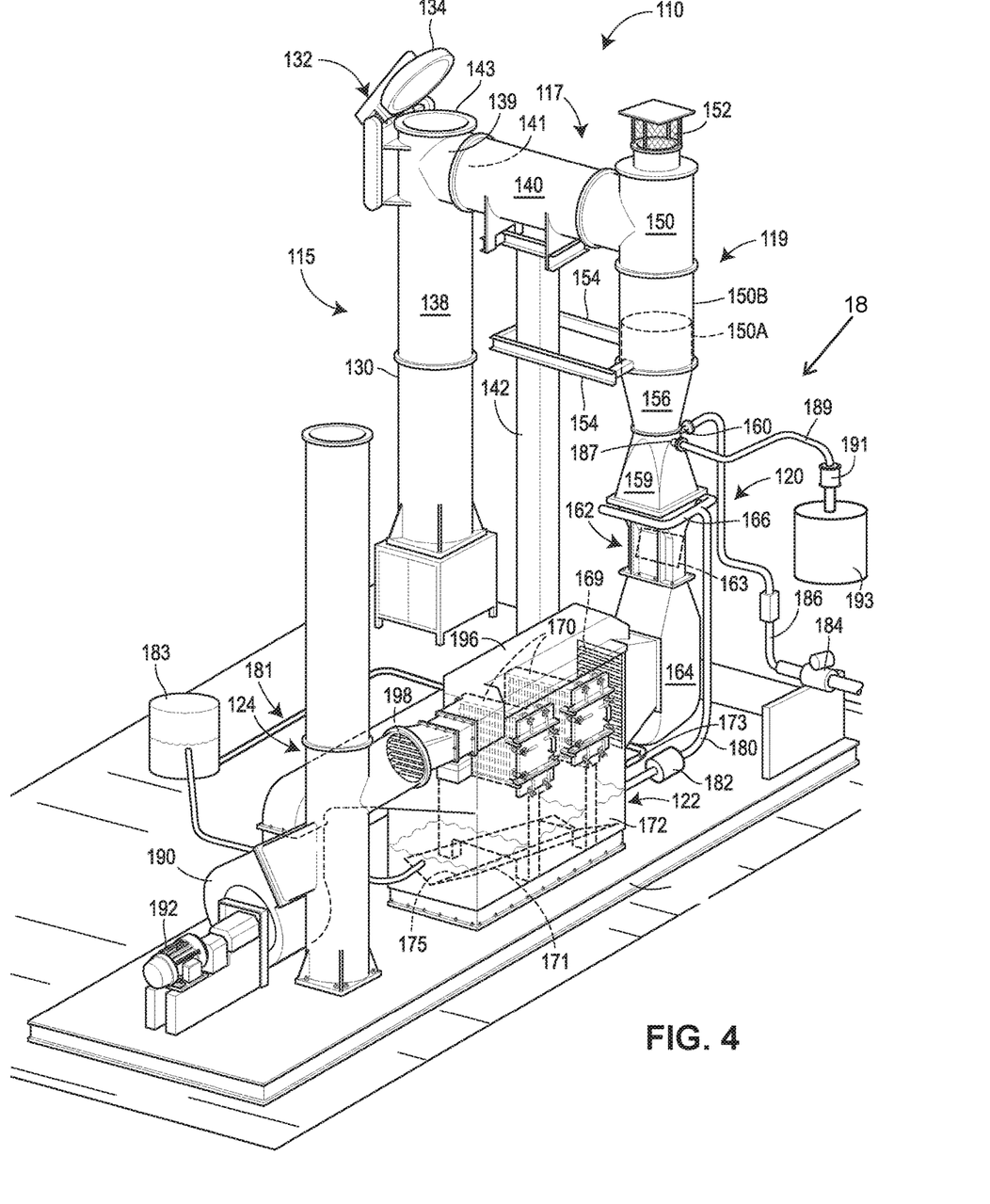
FIG. 4 is a perspective view of one embodiment of a concentrator of the system of FIG. 1.
Figure 5:
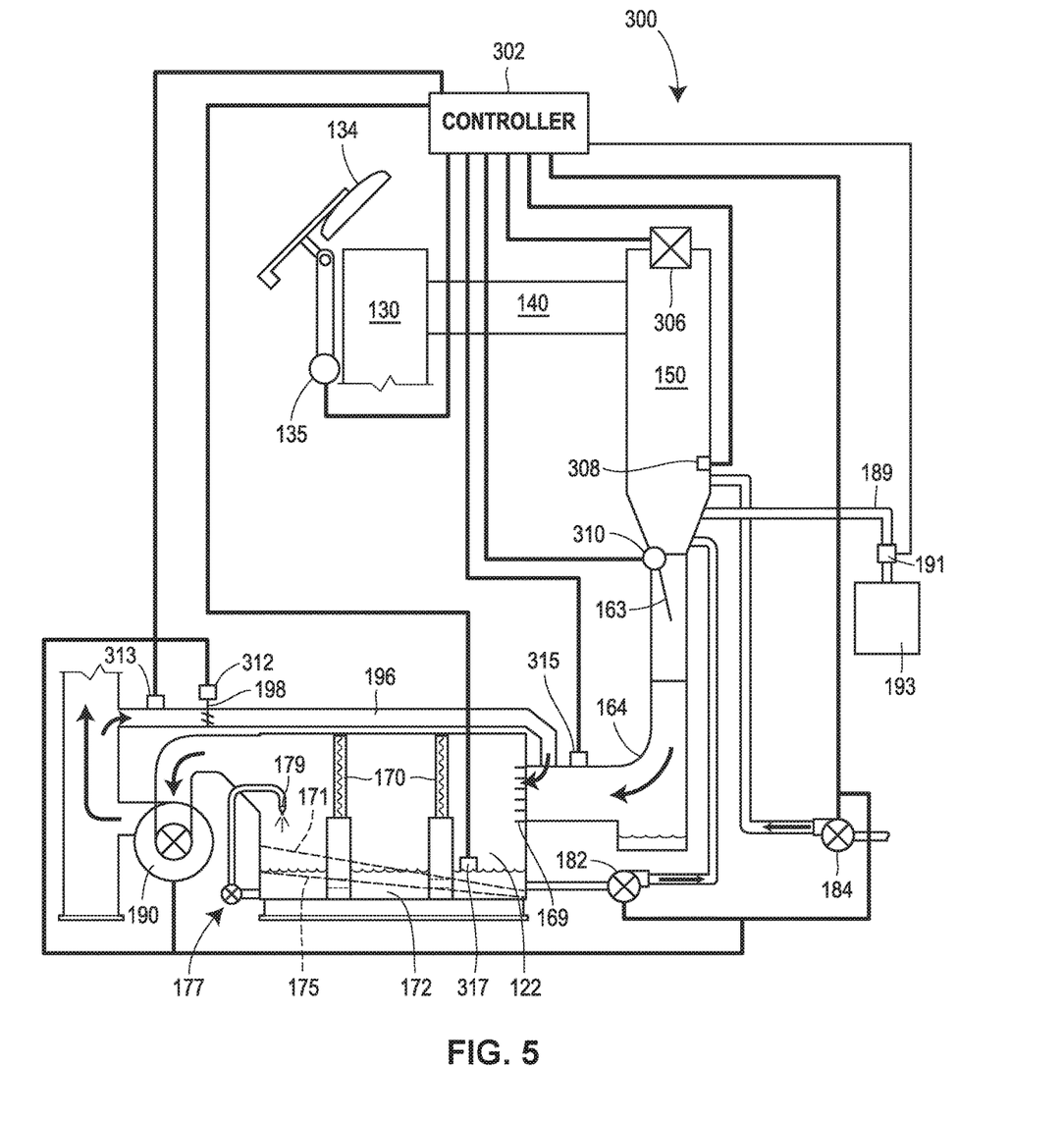
FIG. 5 is a schematic diagram of a control system of the concentrator of FIG. 4.

Turning now to FIGS. 4 and 5, the one example of the concentrator is discussed in more detail. The liquid concentrators 18 described herein may be used to concentrate a wide variety of wastewater streams, such as waste water from industry, runoff water from natural disasters (floods, hurricanes), refinery caustic, leachate such as landfill leachate, flowback water from completion of natural gas wells, produced water from operation of natural gas wells, etc. The liquid concentrator 18 is practical, energy efficient, reliable, and cost-effective. In order to increase the utility of this liquid concentrator, the liquid concentrator 18 is readily adaptable to being mounted on a trailer or a moveable skid to effectively deal with wastewater streams that arise as the result of accidents or natural disasters or to routinely treat wastewater that is generated at spatially separated or remote sites. The liquid concentrator 18 described herein has all of these desirable characteristics and provides significant advantages over conventional wastewater concentrators, especially when the goal is to manage a broad variety of wastewater streams.

Moreover, the concentrator 18 may be largely fabricated from highly corrosion resistant, yet low cost materials such as fiberglass and/or other engineered plastics. This is due, in part, to the fact that the disclosed concentrator is designed to operate under minimal differential pressure. For example, a differential pressure generally in the range of only 10 to 30 inches water column is required. Also, because the gas-liquid contact zones of the concentration processes generate high turbulence within narrowed (compact) passages at or directly after the venturi section of the flow path, the overall design is very compact as compared to conventional concentrators where the gas liquid contact occurs in large process vessels. As a result, the amount of high alloy metals required for the concentrator 18 is quite minimal. Also, because these high alloy parts are small and can be readily replaced in a short period of time with minimal labor, fabrication costs may be cut to an even higher degree by designing some or all of these parts to be wear items manufactured from lesser quality alloys that are to be replaced at periodic intervals. If desired, these lesser quality alloys (e.g., carbon steel) may be coated with corrosion and/or erosion resistant liners, such as engineered plastics including elastomeric polymers, to extend the useful life of such components. Likewise, the pumps may be provided with corrosion and/or erosion resistant liners to extend the life of the pumps, thus further reducing maintenance and replacement costs.

The liquid concentrator 18 provides direct contact of the liquid to be concentrated and the hot gas, effecting highly turbulent heat exchange and mass transfer between hot gas and the liquid, e.g., wastewater, undergoing concentration. Moreover, the concentrator 18 employs highly compact gas-liquid contact zones, making it minimal in size as compared to known concentrators. The direct contact heat exchange feature promotes high energy efficiency and eliminates the need for solid surface heat exchangers as used in conventional, indirect heat transfer concentrators. Further, the compact gas-liquid contact zone eliminates the bulky process vessels used in both conventional indirect and direct heat exchange concentrators. These features allow the concentrator 18 to be manufactured using comparatively low cost fabrication techniques and with reduced weight as compared to conventional concentrators. Both of these factors favor portability and cost-effectiveness. Thus, the liquid concentrator 18 is more compact and lighter in weight than conventional concentrators, which make it ideal for use as a portable unit. Additionally, the liquid concentrator 18 is less prone to fouling and blockages due to the direct contact heat exchange operation and the lack of solid heat exchanger surfaces. The liquid concentrator 18 can also process liquids with significant amounts of suspended solids because of the direct contact heat exchange. As a result, high levels of concentration of the process fluids may be achieved without need for frequent cleaning of the concentrator 18.

Moreover, due to the temperature difference between the gas and liquid, the relatively small volume of liquid contained within the system, the relatively large interfacial area between the liquid and the gas, and the reduced relative humidity of the gas prior to mixing with the liquid, the concentrator 18 approaches the adiabatic saturation temperature for the particular gas/liquid mixture, which is typically in the range of about 150 degrees Fahrenheit to about 215 degrees Fahrenheit (i.e., this concentrator is a "low momentum" concentrator).

Moreover, the concentrator 18 is designed to operate under negative pressure, a feature that greatly enhances the ability to use a very broad range of fuel or waste heat sources as an energy source to affect evaporation. In fact, due to the draft nature of these systems, pressurized or non-pressurized burners may be used to heat and supply the gas used in the concentrator 18. These features provide significant advantages that reflect favorably on the versatility and the costs of buying, operating and maintaining the concentrator 18.

Generally speaking, the compact liquid concentrator system 110 of FIGS. 4 and 5, which includes the concentrator 18, operates to concentrate wastewater, such as landfill leachate, using exhaust or waste heat created within a landfill flare which burns landfill gas in a manner that meets the standards set by the U.S. Environmental Protection Agency (EPA) and/or more local regulatory authority. As is known, most landfills include a flare which is used to burn landfill gas to eliminate methane and other gases prior to release to the atmosphere. Typically, the gas exiting the flare is between 1200 and 1500 degrees Fahrenheit and may reach 1800 degrees Fahrenheit. The compact liquid concentrator system 110 illustrated in FIG. 4 is equally effective in concentrating flowback or produced water from natural gas wells and may be operated on exhaust gas from a natural gas flare, or a propane flare, at or near the well head. The natural gas flare may be supplied with natural gas directly from the natural gas well, in some embodiments.

As illustrated in FIG. 4, the compact liquid concentrator system 110 generally includes or is connected to a flare assembly 115, and includes a heat transfer assembly 117, an air pre-treatment assembly 119, a concentrator assembly 120, a fluid scrubber 122, and an exhaust section 124. The flare assembly 115 includes a flare 130, which burns landfill gas (or other combustible fuel) therein according to any known principles, and a flare cap assembly 132. The flare cap assembly 132 includes a moveable cap 134 (e.g., a flare cap, an exhaust gas cap, etc.) which covers the top of the flare 130, or other type of stack (e.g., a combustion gas exhaust stack), to seal off the top of the flare 130 when the flare cap 134 is in the closed position, or to divert a portion of the flare gas in a partially closed position, and which allows gas produced within the flare 130 to escape to the atmosphere through an open end that forms a primary gas outlet 143, when the flare cap 134 is in an open or partially open position. The flare cap assembly 132 also includes a cap actuator, such as a motor (e.g., an electric motor, a hydraulic motor, a pneumatic motor, etc.,) which moves the flare cap 134 between the fully open and the fully closed positions. The flare cap actuator may, for example, rotate or move the flare cap 134 around a pivot point to open and close the flare cap 134. The flare cap actuator may utilize a chain drive or any other type of drive mechanism connected to the flare cap 134 to move the flare cap 134 around the pivot point. The flare cap assembly 132 may also include a counter-weight disposed on the opposite side of the pivot point from the flare cap 134 to balance or offset a portion of the weight of the flare cap 134 when moving the flare cap 134 around the pivot point. The counter-weight enables the actuator to be reduced in size or power while still being capable of moving or rotating the flare cap 134 between an open position, in which the top of the flare 130 (or the primary combustion gas outlet 143) is open to the atmosphere, and a closed position, in which the flare cap 134 covers and essentially seals the top of the flare 130 (or the primary combustion gas outlet 143). The flare cap 134 itself may be made of high temperature resistant material, such as stainless steel or carbon steel, and may be lined or insulated with refractory material including aluminum oxide and/or zirconium oxide on the bottom portion thereof which comes into direct contact with the hot flare gases when the flare cap 134 is in the closed position.

If desired, the flare 130 may include an adapter section 138 including the primary combustion gas outlet 143 and a secondary combustion gas outlet 141 upstream of the primary combustion gas outlet 143. When the flare cap 130 is in the closed position, combustion gas is diverted through the secondary combustion gas outlet 141. The adapter section 138 may include a connector section 139 that connects the flare 130 (or exhaust stack) to the heat transfer section 117 using a 90 degree elbow or turn. Other connector arrangements are possible. For example, the flare 130 and heat transfer section 117 may be connected at virtually any angle between 0 degrees and 180 degrees. In this case, the flare cap assembly 132 is mounted on the top of the adaptor section 138 proximate the primary combustion gas outlet 143.

The heat transfer assembly 117 includes a transfer pipe 140, which connects to an inlet of the air pre-treatment assembly 119 to the flare 130 and, more particularly, to the adaptor section 138 of the flare 130. A support member 142, in the form of a vertical bar or pole, supports the heat transfer pipe 140 between the flare 130 and the air pre-treatment assembly 119 at a predetermined level or height above the ground. The heat transfer pipe 140 is connected to the connector section 139 or the adapter section 138 at the secondary combustion gas outlet 141, the transfer pipe forming a portion of a fluid passageway between the adapter section 138 and a secondary process, such as a fluid concentrating process. The support member 142 is typically necessary because the heat transfer pipe 140 will generally be made of metal, such as carbon or stainless steel, and may be refractory lined with materials such as aluminum oxide and/or zirconium oxide, to withstand the temperature of the gas being transferred from the flare 130 to the air pre-treatment assembly 119. Thus, the heat transfer pipe 140 will typically be a heavy piece of equipment. However, because the flare 130, on the one hand, and the air pre-treatment assembly 119 and the concentrator assembly 120, on the other hand, are disposed immediately adjacent to one another, the heat transfer pipe 140 generally only needs to be of a relatively short length, thereby reducing the cost of the materials used in the concentrator system 110, as well as reducing the amount of support structure needed to bear the weight of the heavy parts of the concentrator system 110 above the ground. The heat transfer pipe 140 and the air pre-treatment assembly 1119 form an upside-down U-shaped structure.

The air pre-treatment assembly 119 includes a vertical piping section 150 and an ambient air valve (not shown explicitly in FIG. 4) disposed at the top of the vertical piping section 150. The ambient air valve (also referred to as a damper or bleed valve) forms a fluid passageway between the heat transfer pipe 140 (or air pre-treatment assembly 119) and the atmosphere. The ambient air valve operates to allow ambient air to flow through a mesh bird screen 152 (typically wire or metal) and into the interior of the air pre-treatment assembly 119 to mix with the hot gas coming from the flare 130. If desired, the air pre-treatment assembly 119 may include a permanently open section proximate to the bleed valve which always allows some amount of bleed air into the air pre-treatment assembly 119, which may be desirable to reduce the size of the required bleed valve and for safety reasons. A pressure blower (not shown) may be connected to the inlet side of the ambient air valve, if desired, to force ambient air through the ambient air valve. If a pressure blower is implemented, the bird screen 152 and permanently open section (if implemented) may be relocated to the inlet side of the pressure blower. While the control of the ambient air or bleed valve will be discussed in greater detail hereinafter, this valve generally allows the gas from the flare 130 to be cooled to a more desirable temperature before entering into the concentrator assembly 120. The air pre-treatment assembly 119 may be supported in part by cross-members 154 connected to the support member 142. The cross-members 154 stabilize the air pre-treatment assembly 119, which is also typically made of heavy carbon or stainless steel or other metal, and which may be refractory-lined to improve energy efficiency and to withstand the high temperature of the gases within this section of the concentrator system 110. If desired, the vertical piping section 150 may be extendable to adapt to or account for flares of differing heights so as to make the liquid concentrator system 110 easily adaptable to many different flares or to flares of different heights and also to improve efficiency when erecting concentrators by correcting for slight vertical and/or horizontal misalignment of components. The vertical piping section 150 may include a first section 150A (shown using dotted lines) that rides inside of a second section 150B thereby allowing the vertical piping section 150 to be adjustable in length (height).

Generally speaking, the air pre-treatment assembly 119 operates to mix ambient air provided through the ambient air valve beneath the screen 152 and the hot gas flowing from the flare 130 through the heat transfer pipe 140 to create a desired temperature of gas at the inlet of the concentrator assembly 120.

The liquid concentrator assembly 120 includes a lead-in section 156 having a reduced cross-section at the top end thereof which mates the bottom of the piping section 150 to a quencher 159 of the concentrator assembly 120. The concentrator assembly 120 also includes a first fluid inlet 160, which injects new or untreated liquid to be concentrated, such as landfill leachate, into the interior of the quencher 159. The inlet 160 may include a coarse sprayer with a large nozzle for spraying the untreated liquid into the quencher 159. Because the liquid being sprayed into the quencher 159 at this point in the system is not yet concentrated, and thus has large amount of water therein, and because the sprayer is a coarse sprayer, the sprayer nozzle is not subject to fouling or being clogged by the small particles within the liquid. As will be understood, the quencher 159 operates to quickly reduce the temperature of the gas stream (e.g., from about 900 degrees Fahrenheit to less than 200 degrees Fahrenheit) while performing a high degree of evaporation on the liquid injected at the inlet 160. If desired, a temperature sensor may be located at or near the exit of the piping section 150 or in the quencher 159 and may be used to control the position of the ambient air valve to thereby control the temperature of the gas present at the inlet of the concentrator assembly 120.

The quencher 159 is connected to liquid injection chamber which is connected to narrowed portion or venturi section 162 which has a narrowed cross section with respect to the quencher 159 and which has a venturi plate 163 (shown in dotted line) disposed therein. The venturi plate 163 creates a narrow passage through the venturi section 162, which creates a large pressure drop between the entrance and the exit of the venturi section 162. This large pressure drop causes turbulent gas flow and shearing forces within the quencher 159 and the top or entrance of the venturi section 162, and causes a high rate of gas flow out of the venturi section 162, both of which lead to thorough mixing of the gas and liquid in the venturi section 162. The position of the venturi plate 163 may be controlled with a manual control rod connected to the pivot point of the plate 163, or via an automatic positioner that may be driven by an electric motor or pneumatic cylinder.

A re-circulating pipe 166 extends around opposite sides of the entrance of the venturi section 162 and operates to inject partially concentrated (i.e., re-circulated) liquid into the venturi section 162 to be further concentrated and/or to prevent the formation of dry particulate within the concentrator assembly 120 through multiple fluid entrances located on one or more sides of the flow corridor. A number of pipes, such as three pipes of, for example, ½ inch diameter, may extend from each of the opposites legs of the pipe 166 partially surrounding the venturi section 162, and through the walls and into the interior of the venturi section 162. Because the liquid being ejected into the concentrator system 110 at this point is re-circulated liquid, and is thus either partially concentrated or being maintained at a particular equilibrium concentration and more prone to plug a spray nozzle than the less concentrated liquid injected at the inlet 160, this liquid may be directly injected without a sprayer so as to prevent clogging. However, if desired, a baffle in the form of a flat plate may be disposed in front of each of the openings of the ½ diameter pipes to cause the liquid being injected at this point in the system to hit the baffle and disperse into the concentrator assembly 120 as smaller droplets. In any event, the configuration of this re-circulating system distributes or disperses the re-circulating liquid better within the gas stream flowing through the concentrator assembly 120.

The combined hot gas and liquid flows in a turbulent manner through the venturi section 162. As noted above, the venturi section 162, which has a moveable venturi plate 163 disposed across the width of the concentrator assembly 120, causes turbulent flow and complete mixture of the liquid and gas, causing rapid evaporation of the discontinuous liquid phase into the continuous gas phase. Because the mixing action caused by the venturi section 162 provides a high degree of evaporation, the gas cools substantially in the concentrator assembly 120, and exits the venturi section 162 into a flooded elbow 164 at high rates of speed. In fact, the temperature of the gas-liquid mixture at this point may be about 160 degrees Fahrenheit.

As is typical of flooded elbows, a weir arrangement (not shown) within the bottom of the flooded elbow 164 maintains a constant level of partially or fully concentrated re-circulated liquid disposed therein. Droplets of re-circulated liquid that are entrained in the gas phase as the gas-liquid mixture exits the venturi section 162 at high rates of speed are thrown outward onto the surface of the re-circulated liquid held within the bottom of the flooded elbow 164 by centrifugal force generated when the gas-liquid mixture is forced to turn 90 degrees to flow into the fluid scrubber 122. Significant numbers of liquid droplets entrained within the gas phase that impinge on the surface of the re-circulated liquid held in the bottom of the flooded elbow 164 coalesce and join with the re-circulated liquid thereby increasing the volume of re-circulated liquid in the bottom of the flooded elbow 164 causing an equal amount of the re-circulated liquid to overflow the weir arrangement and flow by gravity into the sump 172 at the bottom of the fluid scrubber 122. Thus, interaction of the gas-liquid stream with the liquid within the flooded elbow 164 removes liquid droplets from the gas-liquid stream, and also prevents suspended particles within the gas-liquid stream from hitting the bottom of the flooded elbow 164 at high velocities, thereby preventing erosion of the metal that forms the portions of side walls located beneath the level of the weir arrangement and the bottom of the flooded elbow 164.

After leaving the flooded elbow 164, the gas-liquid stream in which evaporated liquid and some liquid and other particles still exist, flows through the fluid scrubber 122 which is, in this case, a cross-flow fluid scrubber. The fluid scrubber 122 includes various screens or filters which serve to remove entrained liquids and other particles from the gas-liquid stream. In one particular example, the cross flow scrubber 122 may include an initial coarse impingement baffle 169 at the input thereof, which is designed to remove liquid droplets in the range of 50 to 100 microns in size or higher. Thereafter, two removable filters in the form of chevrons 170 are disposed across the fluid path through the fluid scrubber 122, and the chevrons 170 may be progressively sized or configured to remove liquid droplets of smaller and smaller sizes, such as 20-30 microns and less than 10 microns. Of course, more or fewer filters or chevrons could be used.

As is typical in cross flow scrubbers, liquid captured by the filters 169 and 170 and the overflow weir arrangement within the bottom of the flooded elbow 164 drain by gravity into a reservoir or sump 172 located at the bottom of the fluid scrubber 122. The sump 172, which may hold, for example approximately 200 gallons of liquid, thereby collects concentrated fluid containing dissolved and suspended solids removed from the gas-liquid stream and operates as a reservoir for a source of re-circulating concentrated liquid back to the concentrator assembly 120 to be further treated and/or to prevent the formation of dry particulate within the concentrator assembly 120. In one embodiment, the sump 172 may include a sloped V-shaped bottom 171 having a V-shaped groove 175 extending from the back of the fluid scrubber 122 (furthest away from the flooded elbow 164) to the front of the fluid scrubber 122 (closest to the flooded elbow 164), wherein the V-shaped groove 175 is sloped such that the bottom of the V-shaped groove 175 is lower at the end of the fluid scrubber 122 nearest the flooded elbow 164 than at an end farther away from the flooded elbow 164. In other words, the V-shaped bottom 171 may be sloped with the lowest point of the V-shaped bottom 171 proximate the exit port 173 and/or the pump 182. Additionally, a washing circuit 177 (FIG. 5) may pump concentrated fluid from the sump 172 to a sprayer 179 within the cross flow scrubber 122, the sprayer 179 being aimed to spray liquid at the V-shaped bottom 171. Alternatively, the sprayer 179 may spray un-concentrated liquid or clean water at the V-shaped bottom 171. The sprayer 179 may periodically or constantly spray liquid onto the surface of the V-shaped bottom 171 to wash solids and prevent solid buildup on the V-shaped bottom 171 or at the exit port 173 and/or the pump 182. As a result of this V-shaped sloped bottom 171 and washing circuit 177, liquid collecting in the sump 172 is continuously agitated and renewed, thereby maintaining a relatively constant consistency and maintaining solids in suspension. If desired, the spraying circuit 177 may be a separate circuit using a separate pump with, for example, an inlet inside of the sump 172, or may use a pump 182 associated with a concentrated liquid re-circulating circuit described below to spray concentrated fluid from the sump 172 onto the V-shaped bottom 171.

A return line 180, as well as a pump 182, operate to re-circulate fluid removed from the gas-liquid stream from the sump 172 back to the concentrator 120 and thereby complete a fluid or liquid re-circulating circuit. Likewise, a pump 184 may be provided within an input line 186 to pump new or untreated liquid, such as landfill leachate, to the input 160 of the concentrator assembly 120. Also, one or more sprayers 185 may be disposed inside the fluid scrubber 122 adjacent the chevrons 170 and may be operated periodically to spray clean water or a portion of the wastewater feed on the chevrons 170 to keep them clean.

Concentrated liquid also may be removed from the bottom of the fluid scrubber 122 via the exit port 173 and may be further processed or disposed of in any suitable manner in a secondary re-circulating circuit 181. In particular, the concentrated liquid removed by the exit port 173 contains a certain amount of suspended solids, which preferably may be separated from the liquid portion of the concentrated liquid and removed from the system using the secondary re-circulating circuit 181. For example, concentrated liquid removed from the exit port 173 may be transported through the secondary re-circulating circuit 181 to one or more solid/liquid separating devices 183, such as settling tanks, vibrating screens, rotary vacuum filters, horizontal belt vacuum filters, belt presses, filter presses, and/or hydro-cyclones. After the suspended solids and liquid portion of the concentrated wastewater are separated by the solid/liquid separating device 183, the liquid portion of the concentrated wastewater with suspended particles substantially removed may be returned to the sump 172 for further processing in the first or primary re-circulating circuit connected to the concentrator.

The gas, which flows through and out of the fluid scrubber 122 with the liquid and suspended solids removed therefrom, exits out of piping or ductwork at the back of the fluid scrubber 122 (downstream of the chevrons 170) and flows through an induced draft fan 190 of the exhaust assembly 124, from where it is exhausted to the atmosphere in the form of the cooled hot inlet gas mixed with the evaporated water vapor. Of course, an induced draft fan motor 192 is connected to and operates the fan 190 to create negative pressure within the fluid scrubber 122 so as to ultimately draw gas from the flare 130 through the transfer pipe 140, the air pre-treatment assembly 119 and the concentrator assembly 120. The induced draft fan 190 needs only to provide a slight negative pressure within the fluid scrubber 122 to assure proper operation of the concentrator system 110.

While the speed of the induced draft fan 190 can be varied by a device such as a variable frequency drive operated to create varying levels of negative pressure within the fluid scrubber 122 and thus can usually be operated within a range of gas flow capacity to assure complete gas flow from the flare 130, if the gas being produced by the flare 130 is not of sufficient quantity, the operation of the induced draft fan 190 cannot necessarily be adjusted to assure a proper pressure drop across the fluid scrubber 122 itself. That is, to operate efficiently and properly, the gas flowing through the fluid scrubber 122 must be at a sufficient (minimal) flow rate at the input of the fluid scrubber 122. Typically this requirement is controlled by keeping at least a preset minimal pressure drop across the fluid scrubber 122. However, if the flare 130 is not producing at least a minimal level of gas, increasing the speed of the induced draft fan 190 will not be able to create the required pressure drop across the fluid scrubber 122.

To compensate for this situation, the cross flow scrubber 122 is designed to optionally include a gas re-circulating circuit which can be used to assure that enough gas is present at the input of the fluid scrubber 122 to enable the system to acquire the needed pressure drop across the fluid scrubber 122. In particular, the gas re-circulating circuit includes a gas return line or return duct 196 which connects the high pressure side of the exhaust assembly 124 (e.g., downstream of the induced draft fan 190) to the input of the fluid scrubber 122 (e.g., a gas input of the fluid scrubber 122) and a baffle or control mechanism 198 disposed in the return duct 196 which operates to open and close the return duct 196 to thereby fluidly connect the high pressure side of the exhaust assembly 124 to the input of the fluid scrubber 122. During operation, when the gas entering into the fluid scrubber 122 is not of sufficient quantity to obtain the minimal required pressure drop across the fluid scrubber 122, the baffle 198 (which may be, for example, a gas valve, a damper such as a louvered damper, etc.) is opened to direct gas from the high pressure side of the exhaust assembly 124 (i.e., gas that has traveled through the induced draft fan 190) back to the input of the fluid scrubber 122. This operation thereby provides a sufficient quantity of gas at the input of the fluid scrubber 122 to enable the operation of the induced draft fan 190 to acquire the minimal required pressure drop across the fluid scrubber 122.

The fluid concentrator system 110 is also a very fast-acting concentrator. Because the concentrator system 110 is a direct contact type of concentrator, it is not subject to deposit buildup, clogging and fouling to the same extent as most other concentrators. Still further, the ability to control the flare cap 134 to open and close, depending on whether the concentrator system 110 is being used or operated, allows the flare 130 to be used to burn landfill gas without interruption when starting and stopping the concentrator system 110. More particularly, the flare cap 134 can be quickly opened at any time to allow the flare 130 to simply burn landfill gas as normal while the concentrator system 110 is shut down. On the other hand, the flare cap 134 can be quickly closed when the concentrator system 110 is started up, thereby diverting hot gasses created in the flare 130 to the concentrator system 110, and allowing the concentrator system 110 to operate without interrupting the operation of the flare 130. In either case, the concentrator system 110 can be started and stopped based on the operation of the flare cap 134 without interrupting the operation of the flare 130.

If desired, the flare cap 134 may be opened to a partial amount during operation of the concentrator system 110 to control the amount of gas that is transferred from the flare 130 to the concentrator system 110. This operation, in conjunction with the operation of the ambient air valve, may be useful in controlling the temperature of the gas at the entrance of the venturi section 162.

Moreover, due to the compact configuration of the air pre-treatment assembly 119, the concentrator assembly 120 and the fluid scrubber 122, parts of the concentrator assembly 120, the fluid scrubber 122, the draft fan 190 and at least a lower portion of the exhaust section 124 can be permanently mounted on (connected to and supported by) a skid or plate. The upper parts of the concentrator assembly 120, the air pre-treatment assembly 119 and the heat transfer pipe 140, as well as a top portion of the exhaust stack, may be removed and stored on the skid or plate for transport, or may be transported in a separate truck. Because of the manner in which the lower portions of the concentrator system 110 can be mounted to a skid or plate, the concentrator system 110 is easy to move and install. In particular, during set up of the concentrator system 110, the skid, with the fluid scrubber 122, the flooded elbow 164 and the draft fan 190 mounted thereon, may be offloaded at the site at which the concentrator system 110 is to be used by simply offloading the skid onto the ground or other containment area at which the concentrator system 110 is to be assembled. Thereafter, the venturi section 162, the quencher 159, and the air pre-treatment assembly 119 may be placed on top of and attached to the flooded elbow 164. The piping section 150 may then be extended in height to match the height of the flare 130 to which the concentrator system 110 is to be connected. In some cases, this may first require mounting the flare cap assembly 132 onto a pre-existing flare 130. Thereafter, the heat transfer pipe 140 may be raised to the proper height and attached between the flare 130 and the air pre-treatment assembly 119, while the support member 142 is disposed in place. For concentrators in the range of 10,000 to 30,000 gallons per day evaporative capacity, it is possible that the entire flare assembly 115 may be mounted on the same skid or plate as the concentrator 120.

Because most of the pumps, fluid lines, sensors and electronic equipment are disposed on or are connected to the fluid concentrator assembly 120, the fluid scrubber 122 or the draft fan assembly 190, setup of the concentrator system 110 at a particular site does requires only minimal plumbing, mechanical, and electrical work at the site. As a result, the concentrator system 110 is relatively easy to install and to set up at (and to disassemble and remove from) a particular site. Moreover, because a majority of the components of the concentrator system 110 are permanently mounted to the skid, the concentrator system 110 can be easily transported on a truck or other delivery vehicle and can be easily dropped off and installed at particular location, such as next to a landfill flare.

FIG. 5 illustrates a schematic diagram of a control system 300 that may be used to operate the concentrator system 110 of FIG. 4. As illustrated in FIG. 5, the control system 300 includes a controller 302, which may be a form of digital signal processor type of controller, a programmable logic controller (PLC) which may run, for example, ladder logic based control, or any other type of controller. The controller 302 is, of course, connected to various components within the concentrator system 110. In particular, the controller 302 is connected to the flare cap drive motor 135, which controls the opening and closing operation of the flare cap 134. The motor 135 may be set up to control the flare cap 134 to move between a fully open and a fully closed position. However, if desired, the controller 302 may control the drive motor 135 to open the flare cap 134 to any of a set of various different controllable positions between the fully opened and the fully closed position. The motor 135 may be continuously variable if desired, so that the flare cap 134 may be positioned at any desired point between fully open and fully closed.

Additionally, the controller 302 is connected to and controls the ambient air inlet valve 306 disposed in the air pre-treatment assembly 119 of FIG. 4 upstream of the venturi section 162 and may be used to control the pumps 182 and 184 which control the amount of and the ratio of the injection of new liquid to be treated and the re-circulating liquid being treated within the concentrator system 110. The controller 302 may be operatively connected to a sump level sensor 317 (e.g., a float sensor, a non-contact sensor such as a radar or sonic unit, or a differential pressure cell). The controller 302 may use a signal from the sump level sensor 317 to control the pumps 182 and 184 to maintain the level of concentrated fluid within the sump 172 at a predetermined or desired level. Also, the controller 302 may be connected to the induced draft fan 190 to control the operation of the fan 190, which may be a single speed fan, a variable speed fan or a continuously controllable speed fan. In one embodiment, the induced draft fan 190 is driven by a variable frequency motor, so that the frequency of the motor is changed to control the speed of the fan. Moreover, the controller 302 is connected to a temperature sensor 308 disposed at, for example, the inlet of the concentrator assembly 120 or at the inlet of the venturi section 162, and receives a temperature signal generated by the temperature sensor 308. The temperature sensor 308 may alternatively be located downstream of the venturi section 162 or the temperature sensor 308 may include a pressure sensor for generating a pressure signal.

During operation and at, for example, the initiation of the concentrator system 110, when the flare 130 is actually running and is thus burning landfill gas, the controller 302 may first turn on the induced draft fan 190 to create a negative pressure within the fluid scrubber 122 and the concentrator assembly 120. The controller 302 may then or at the same time, send a signal to the motor 135 to close the flare cap 134 either partially or completely, to direct waste heat from the flare 130 into the transfer pipe 140 and thus to the air pre-treatment assembly 119. Based on the temperature signal from the temperature sensor 308, the controller 302 may control the ambient air valve 306 (typically by closing this valve partially or completely) and/or the flare cap actuator to control the temperature of the gas at the inlet of the concentrator assembly 120. Generally speaking, the ambient air valve 306 may be biased in a fully open position (i.e., may be normally open) by a biasing element such as a spring, and the controller 302 may begin to close the valve 306 to control the amount of ambient air that is diverted into the air pre-treatment assembly 119 (due to the negative pressure in the air pre-treatment assembly 119), so as to cause the mixture of the ambient air and the hot gases from the flare 130 to reach a desired temperature. Additionally, if desired, the controller 302 may control the position of the flare cap 134 (anywhere from fully open to fully closed) and may control the speed of the induced draft fan 190, to control the amount of gas that enters the air pre-treatment assembly 119 from the flare 130. As will be understood, the amount of gas flowing through the concentrator system 110 may need to vary depending on ambient air temperature and humidity, the temperature of the flare gas, the amount of gas exiting the flare 130, etc. The controller 302 may therefore control the temperature and the amount of gas flowing through the concentrator assembly 120 by controlling one or any combination of the ambient air control valve 306, the position of the flare cap 134 and the speed of the induced draft fan 190 based on, for example, the measurement of the temperature sensor 308 at the inlet of the concentrator assembly 120. This feedback system is desirable because, in many cases, the air coming out of a flare 130 is between 1200 and 1800 degrees Fahrenheit, which may be too hot, or hotter than required for the concentrator system 110 to operate efficiently and effectively.

In any event, as illustrated in FIG. 5, the controller 302 may also be connected to a motor 310 which drives or controls the position of the venturi plate 163 within the narrowed portion of the concentrator assembly 120 to control the amount of turbulence caused within the concentrator assembly 120. Still further, the controller 302 may control the operation of the pumps 182 and 184 to control the rate at which (and the ratio at which) the pumps 182 and 184 provide re-circulating liquid and new waste fluid to be treated to the inputs of the quencher 159 and the venturi section 162. In one embodiment, the controller 302 may control the ratio of the re-circulating fluid to new fluid to be about 10:1, so that if the pump 184 is providing 8 gallons per minute of new liquid to the input 160, the re-circulating pump 182 is pumping 80 gallons per minute. Additionally, or alternatively, the controller 302 may control the flow of new liquid to be processed into the concentrator (via the pump 184) by maintaining a constant or predetermined level of concentrated liquid in the sump 172 using, for example, the level sensor 317. Of course, the amount of liquid in the sump 172 will be dependent on the rate of concentration in the concentrator, the rate at which concentrated liquid is pumped from or otherwise exists the sump 172 via the secondary re-circulating circuit and the rate at which liquid from the secondary re-circulating circuit is provided back to the sump 172, as well as the rate at which the pump 182 pumps liquid from the sump 172 for delivery to the concentrator via the primary re-circulating circuit.

If desired, one or both of the ambient air valve 306 and the flare cap 134 may be operated in a fail-safe open position, such that the flare cap 134 and the ambient air valve 306 open in the case of a failure of the system (e.g., a loss of control signal) or a shutdown of the concentrator system 110. In one case, the flare cap motor may be spring loaded or biased with a biasing element, such as a spring, to open the flare cap 134 or to allow the flare cap 134 to open upon loss of power to the motor. Alternatively, the biasing element may be the counter-weight on the flare cap 134 may be so positioned that the flare cap 134 itself swings to the open position under the applied force of the counter-weight when the motor 135 loses power or loses a control signal. This operation causes the flare cap 134 to open quickly, either when power is lost or when the controller 302 opens the flare cap 134, to thereby allow hot gas within the flare 130 to exit out of the top of the flare 130. Of course, other manners of causing the flare cap 134 to open upon loss of control signal can be used, including the use of a torsion spring on the pivot point 136 of the flare cap 134, a hydraulic or pressurized air system that pressurizes a cylinder to close the flare cap 134, loss of which pressure causes the flare cap 134 to open upon loss of the control signal, etc.

Thus, as will be noted from the above discussion, the combination of the flare cap 134 and the ambient air valve 306 work in unison to protect the engineered material incorporated into the concentrator system 110, as whenever the system is shut down, the flare cap and the air valve 306 automatically immediately open, thereby isolating hot gas generated in the flare 130 from the process while quickly admitting ambient air to cool the process.

Moreover, in the same manner, the ambient air valve 306 may be spring biased or otherwise configured to open upon shut down of the concentrator system 110 or loss of signal to the valve 306. This operation causes quick cooling of the air pre-treatment assembly 119 and the concentrator assembly 120 when the flare cap 134 opens. Moreover, because of the quick opening nature of the ambient air valve 306 and the flare cap 134, the controller 302 can quickly shut down the concentrator system 110 without having to turn off or effect the operation of the flare 130.

Furthermore, as illustrated in the FIG. 5, the controller 302 may be connected to the venturi plate motor 310 or other actuator which moves or actuates the angle at which the venturi plate 163 is disposed within the venturi section 162. Using the motor 310, the controller 302 may change the angle of the venturi plate 163 to alter the gas flow through the concentrator assembly 120, thereby changing the nature of the turbulent flow of the gas through concentrator assembly 120, which may provide for better mixing of the and liquid and gas therein and obtain better or more complete evaporation of the liquid. In this case, the controller 302 may operate the speed of the pumps 182 and 184 in conjunction with the operation of the venturi plate 163 to provide for optimal concentration of the wastewater being treated. Thus, as will be understood, the controller 302 may coordinate the position of the venturi plate 163 with the operation of the flare cap 134, the position of the ambient air or bleed valve 306, and the speed of the induction fan 190 to maximize wastewater concentration (turbulent mixing) without fully drying the wastewater so as to prevent formation of dry particulates. The controller 302 may use pressure inputs from the pressure sensors to position the venturi plate 163. Of course, the venturi plate 163 may be manually controlled or automatically controlled.

The controller 302 may also be connected to a motor 312 which controls the operation of the damper 198 in the gas re-circulating circuit of the fluid scrubber 122. The controller 302 may cause the motor 312 or other type of actuator to move the damper 198 from a closed position to an open or to a partially open position based on, for example, signals from pressure sensors 313, 315 disposed at the gas entrance and the gas exit of the fluid scrubber 122. The controller 302 may control the damper 198 to force gas from the high pressure side of the exhaust section 124 (downstream of the induced draft fan 190) into the fluid scrubber entrance to maintain a predetermined minimum pressure difference between the two pressure sensors 313, 315. Maintaining this minimum pressure difference assures proper operation of the fluid scrubber 122. Of course, the damper 198 may be manually controlled instead or in addition to being electrically controlled.

The concentrator system 110 described herein directly utilizes hot waste gases in processes after the gases have been thoroughly treated to meet emission standards, and so seamlessly separates the operational requirements of the process that generates the waste heat from the process which utilizes the waste heat in a simple, reliable and effective manner.

Embodiments of the devices and processes described above can be readily modified to accommodate the removal of pollutants from the wastewater being concentrated and also from the exhaust gas employed to concentrate that wastewater. Such modifications are contemplated to be particularly advantageous where the pollutants sought to be removed are among those whose emissions are typically regulated by governmental authorities. Examples of such pollutants include hydrogen sulfide ($H_2S$), oxides of sulfur (SOx) commonly present in the exhaust gas from the combustion of landfill gas, and ammonia (NH3). Described below are modifications that may be made to the embodiments of the devices and processes described above to accommodate removal of SOx and NH3, but that description is not intended to be limiting to the removal of only those pollutants.

Returning to FIGS. 3A and 3B, the concentrator section 120 may include a caustic (or alkali) inlet 187 that is connected to a supply of caustic (or alkali) material 193 (e.g., sodium hydroxide or lime) by a supply line 189. A pump 191 may pressurize the supply line 189 with caustic or alkali material from the supply of caustic or alkali material 193 so that the caustic or alkali material is ejected into the concentrator section 120 (e.g., proximate the venturi 162) to mix with the exhaust gas from the flare 130 or generator. In other embodiments, the caustic or alkali material may be mixed with the leachate in the leachate input line 186 prior to being delivered to the concentrator section 120. Regardless, once the caustic or alkali material is delivered to the concentrator section 120, the caustic or alkali material rapidly mixes with the exhaust gas in the concentrator section 120 along with the leachate, as described above. Once mixed, the caustic or alkali material reacts with the oxides of sulfur, converting the oxides of sulfur to sodium sulfate and sodium sulfite or calcium sulfate as described above. Once converted the sodium sulfate, sodium sulfite and/or calcium sulfate immediately transfer into the liquid phase where they either remain dissolved or precipitate out of the gas/liquid mixture in the concentrator section 120. Thus, sulfur that was originally in the form of $H_2S$ within the landfill gas phase is transferred to the liquid phase as sodium sulfate/sulfite and calcium sulfite salts and is ultimately captured along with the concentrated leachate in the sump 172 of the demister section 122 and may be drawn off along with concentrated leachate for later disposal. As illustrated in FIG. 5, the controller 302 may be operatively connected to the pump 191 to control the rate at which caustic or alkali material is metered into the concentrator section 120. The controller 302 may determine a proper metering rate for the caustic based at least in part on the mass flow of exhaust gas through the concentrator section 120 and the percentage of oxides of sulfur within the exhaust gas. Thus, the disclosed concentrator is readily adaptable to variations in exhaust gas components and/or differing mass flow rates of the exhaust gas. As a result, the disclosed concentrator is capable of simultaneously concentrating landfill leachate and removing pollutants, such as oxides of sulfur, from landfill gas flare exhaust or reciprocating engine or turbine exhaust.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A process of removing contaminants and concentrating wastewater, the process comprising:
    delivering liquid wastewater from a source of wastewater to a hydrogen sulfide removal device;
    mixing an oxidant with the wastewater in the hydrogen sulfide removal device to produce a hydrogen sulfide lean effluent and a sulfur precipitate that remains suspended in the effluent;
    delivering the hydrogen sulfide lean effluent and the sulfur precipitate to a direct contact concentrator; and
    evaporating a portion of the hydrogen lean effluent in the direct contact evaporator to produce a slurry comprising the sulfur precipitate and an exhaust gas.

2. The process of claim 1, further comprising:
    delivering the liquid wastewater to a reverse osmosis system before delivering the liquid wastewater to the hydrogen sulfide removal device; and
    filtering the liquid wastewater in the reverse osmosis system to produce a filtered wastewater and a permeate.

3. The process of claim 1, further comprising:
    delivering the exhaust gas to an ammonia scrubber; and
    mixing an acid with the exhaust gas to chemically react with ammonia in the exhaust gas to produce a saturated vapor and an ammonium sulfate.

4. The process of claim 3, wherein the acid is sulfuric acid.

5. The process of claim 1, wherein the oxidant is peroxide.

6. The process of claim 1, further comprising adding sodium hydroxide to the concentrator.

7. The process of claim 1, further comprising delivering the slurry to a solid/liquid separator to produce a supernatant liquid and a sludge.

8. The process of claim 7, further comprising delivering the supernatant liquid back to the concentrator for further concentration.

9. The process of claim 1, further comprising mixing an anti-foaming agent with the effluent in the concentrator.

10. The process of claim 1, further comprising mixing an anti-scalant agent with the effluent in the concentrator.

11. A process of removing contaminants and concentrating wastewater, the process comprising:
    delivering liquid wastewater from a source of wastewater to a direct contact concentrator;
    evaporating a portion of the liquid wastewater in the direct contact evaporator to produce a slurry and an exhaust gas;
    delivering the exhaust gas to an ammonia scrubber; and
    mixing an acid with the exhaust gas to chemically react with ammonia in the exhaust gas to produce a saturated vapor and an ammonium sulfate,
    further comprising delivering the liquid wastewater from a source of wastewater to a hydrogen sulfide removal device before delivering the liquid wastewater to the direct contact evaporator; and
    mixing an oxidant with the liquid wastewater in the hydrogen sulfide removal device to produce a hydrogen sulfide lean effluent and a sulfur precipitate that remains suspended in the sulfide lean effluent.

12. The process of claim 11, further comprising:
    delivering the liquid wastewater to a reverse osmosis system before delivering the liquid wastewater to the hydrogen sulfide removal device; and
    filtering the liquid wastewater in the reverse osmosis system to produce a filtered wastewater and a permeate.

13. The process of claim 11, wherein the acid is sulfuric acid.

14. The process of claim 11, wherein the oxidant is peroxide.

15. The process of claim 11, further comprising adding sodium hydroxide to the concentrator.

16. The process of claim 11, further comprising delivering the slurry to a solid/liquid separator to produce a supernatant liquid and a sludge.

17. The process of claim 16, further comprising delivering the supernatant liquid back to the concentrator for further concentration.

18. The process of claim 11, further comprising mixing an anti-foaming agent with the effluent in the concentrator.

19. The process of claim 11, further comprising mixing an anti-scalant agent with the effluent in the concentrator.

* * * * *